United States Patent [19]

Kamijo et al.

[11] 4,401,928

[45] Aug. 30, 1983

[54] SEAT POSITION AUTOMATIC ADJUSTING DEVICE FOR AN AUTOMOTIVE VEHICLE

[75] Inventors: Ken Kamijo, Yokosuka; Hideyuki Nagashima, Yokohama, both of Japan

[73] Assignee: Nissan Motor Company, Limited, Kanagawa, Japan

[21] Appl. No.: 208,681

[22] Filed: Nov. 20, 1980

[30] Foreign Application Priority Data

Nov. 21, 1979 [JP] Japan .................... 54-150013

[51] Int. Cl.³ .................................... G05B 5/00
[52] U.S. Cl. .................... 318/466; 318/468; 318/467
[58] Field of Search ........... 318/265, 266, 282, 286, 318/466, 468, 470, 467; 296/63, 65 R

[56] References Cited

U.S. PATENT DOCUMENTS

| | | | |
|---|---|---|---|
| 2,983,545 | 5/1961 | Garvey et al. | 318/467 X |
| 3,034,759 | 5/1962 | Carlson et al. | 248/393 |
| 3,223,791 | 12/1965 | Wanlass | 296/65 R X |
| 3,471,765 | 10/1969 | Littmann | 318/286 |
| 3,472,978 | 10/1969 | Granata, Jr. et al. | 318/466 X |
| 3,597,554 | 8/1971 | Siegal | 318/466 X |
| 3,626,130 | 12/1971 | Siegal | 318/466 X |
| 4,158,160 | 6/1979 | Meiller | 318/467 |

FOREIGN PATENT DOCUMENTS

| | | |
|---|---|---|
| 735 | 4/1979 | European Pat. Off. |
| 1297 | 4/1979 | European Pat. Off. |
| 1043742 | 11/1958 | Fed. Rep. of Germany |
| 1116550 | 11/1961 | Fed. Rep. of Germany |
| 2262558 | 6/1974 | Fed. Rep. of Germany |
| 2754689 | 6/1979 | Fed. Rep. of Germany |
| 2810870 | 9/1979 | Fed. Rep. of Germany |
| 2812306 | 10/1979 | Fed. Rep. of Germany |
| 2364138 | 4/1978 | France |
| 1469557 | 4/1977 | United Kingdom |

Primary Examiner—Ulysses Weldon
Attorney, Agent, or Firm—Lowe, King, Price & Becker

[57] ABSTRACT

A seat position automatic adjusting device used for an automotive vehicle motor-powered front seat comprises a single reversible motor for actuating the adjusting mechanism to adjust each seat member to a desired position. A control circuit counts and stores the number of rotations of the reversible motor and outputs a control signal by calculating the difference between the current seat position data from the stored value and the original seat position data. A drive circuit drives the reversible motor to automatically return the current seat position to the original seat position to the original seat position in response to the control signal from said control circuit.

6 Claims, 4 Drawing Figures

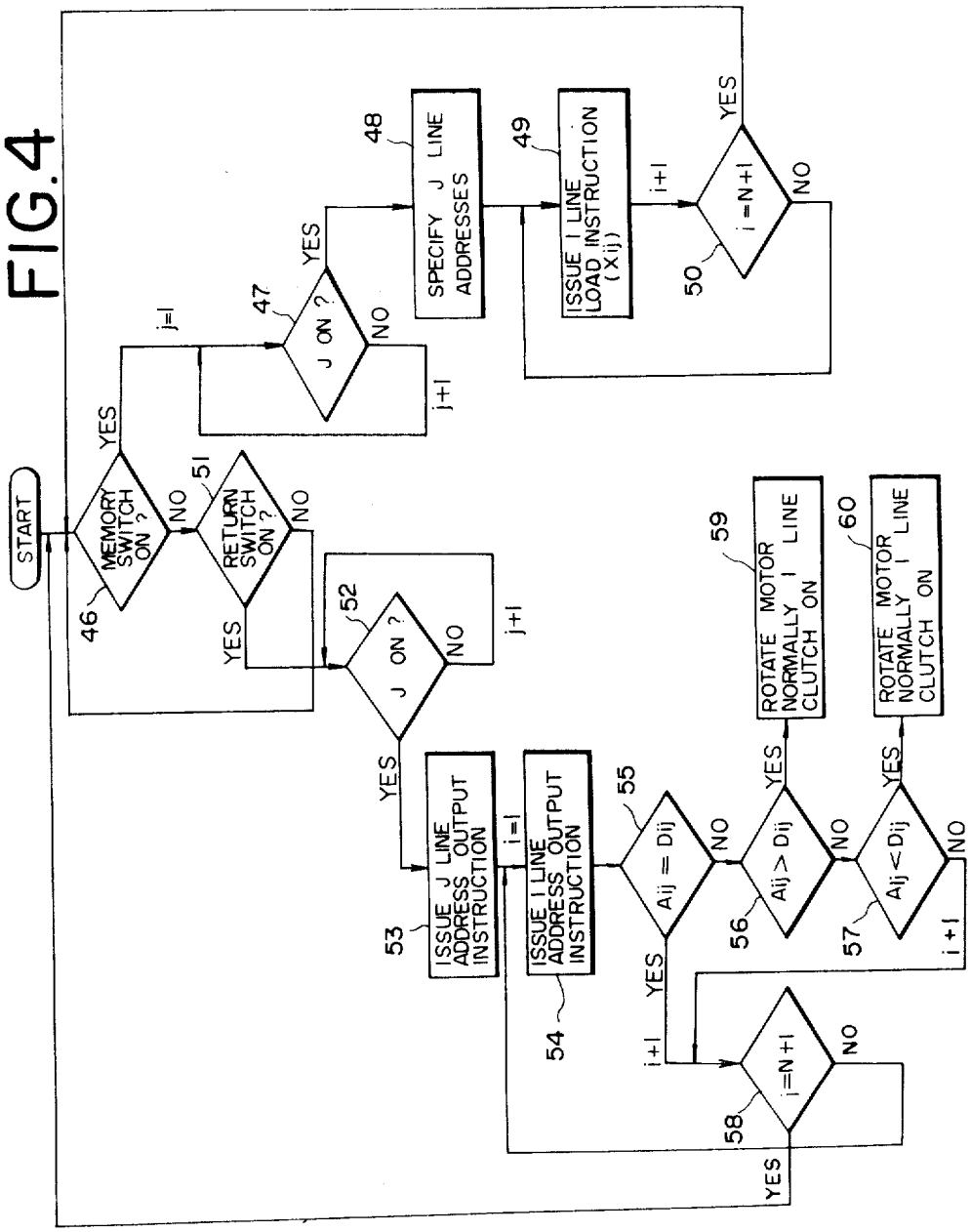

SEAT POSITION AUTOMATIC ADJUSTING DEVICE FOR AN AUTOMOTIVE VEHICLE

BACKGROUND OF THE INVENTION

1. Field of the Invention

The present invention relates to an automatic seat position adjusting device for an automotive vehicle to adjust a driver's seat position and sitting posture for each of the adjustment directions; a seat front-and-rear direction, a seat up-and-down direction, a seat back tilted angle, a seat back lumbar support angle, a seat cushion titled angle, and a head restraint up-and-down direction.

2. Description of the Prior Art

A conventional motor-powered seat adjustment device has been used for front seats of an automotive vehicle to adjust the seat height, forward-and-backward position, and tilt. On some automotive vehicles, the powered seat adjustment device can adjust a seat back tilted angle, a lumbar support angle, and a head restraint height in addition to the above-described adjustable directions of the seat.

Such a motor-powered seat adjustment device can be operated manually with the driver sitting on the seat. However, to make the seat position adjustment more convenient, an automatic seat position adjusting device has been proposed which can return the seat to an originally adjusted position.

Therefore, when the driver desires to return the seat position to an originally adjusted position after the driver himself or another driver has readjusted the seat position to suit his driving posture by means of a motor driving manual switch, a return switch on an operation panel located on a side of the seat may be operated. This causes originally adjusted position data stored in a memory at a time when a memory switch on the operation panel is operated to be fed into comparators where the stored position data are compared with the readjusted position data from each position sensor. The result of the comparison is fed into a control circuit which controls a driving circuit so as to make the readjusted position data equal to the originally adjusted position data. Consequently, the driving circuit drives a motor so as to return the changed seat position to the original position automatically. Such a motor-powered seat adjustment device described above has an adjustment mechanism for each of the seat direction adjustments so that the whole adjustment mechanism must be integrally built in a limited space within the seat.

In addition, the position sensors each comprising, e.g., limit switches and a gear mechanism the number of which correspond to the number of the seat member directions to be adjusted, must be included in the motor-powered seat adjustment device.

Therefore, there arises a problem that it is considerably difficult to incorporate such a number of position sensors into such a limited space wherein the driving motor or other adjustment mechanism are already incorporated. Further, a major change of the internal adjustment mechanism of the motor-powered seat would be involved.

SUMMARY OF THE INVENTION

According to the present invention, there is provided a device which detects and stores a selected seat position and automatically returns a readjusted seat position different from the selected position to the position. The number of rotations of a reversible motor for driving the seat are stored in a memory of the device and its counted number of rotations is added or substracted, according to the rotational direction of the motor, to the readjusted seat position data so that the seat position is automatically returned to the originally selected position.

BRIEF DESCRIPTION OF THE DRAWINGS

The features and advantages of the seat position automatic adjusting device according to the present invention will be better appreciated from the following description taken in conjunction with the accompanying drawings in which like reference numerals designate corresponding elements, in which:

FIG. 4 shows a processing flowchart of a program loaded in a microcomputer used in the preferred embodiment shown in FIG. 3.

DESCRIPTION OF THE PREFERRED EMBODIMENT

Reference will be made to the drawings, and first to FIG. 1 in which each adjusting direction of a motor-powered seat is illustrated.

Figure 1:
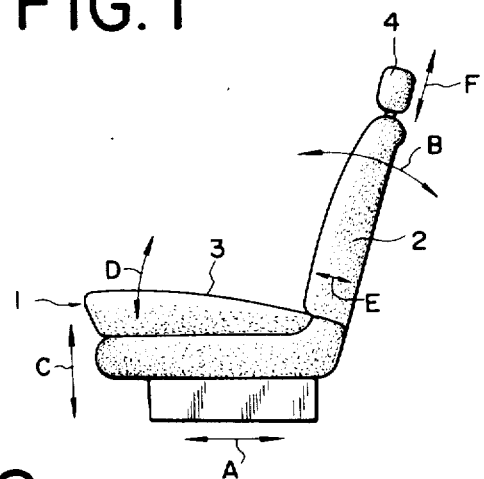
FIG. 1 is a simplified side view of a motor-powered seat explaining the adjustable directions of the seat members.

In FIG. 1, numeral 1 denotes a seat used, e.g., as an automotive vehicle driver seat, numeral 2 a seat back, numeral 3 a seat cushion, and numeral 4 a head restraint. The solid line denoted by A shows the front-and-rear directions of the seat 1. The solid line denoted by B shows the reclining adjustment direction of the seat back 2. The solid line denoted by C shows the height (up-and-down) adjustment direction of the seat 1. The solid line denoted by D shows the tilted angle adjustment of the seat cushion 3. The solid line denoted by E shows the lumbar support tilted angle of the seat back 2. The solid line denoted by F shows the up-and-down adjustment of the head restraint 4.

The motor-powered seat comprising the members described above can be moved to a desired position by means of a motor, with the vehicle driver sitting on the seat. To make the seat position adjustment more convenient, a seat position adjustment device has been proposed which automatically returns the current seat position to the originally adjusted position.

Figure 2:
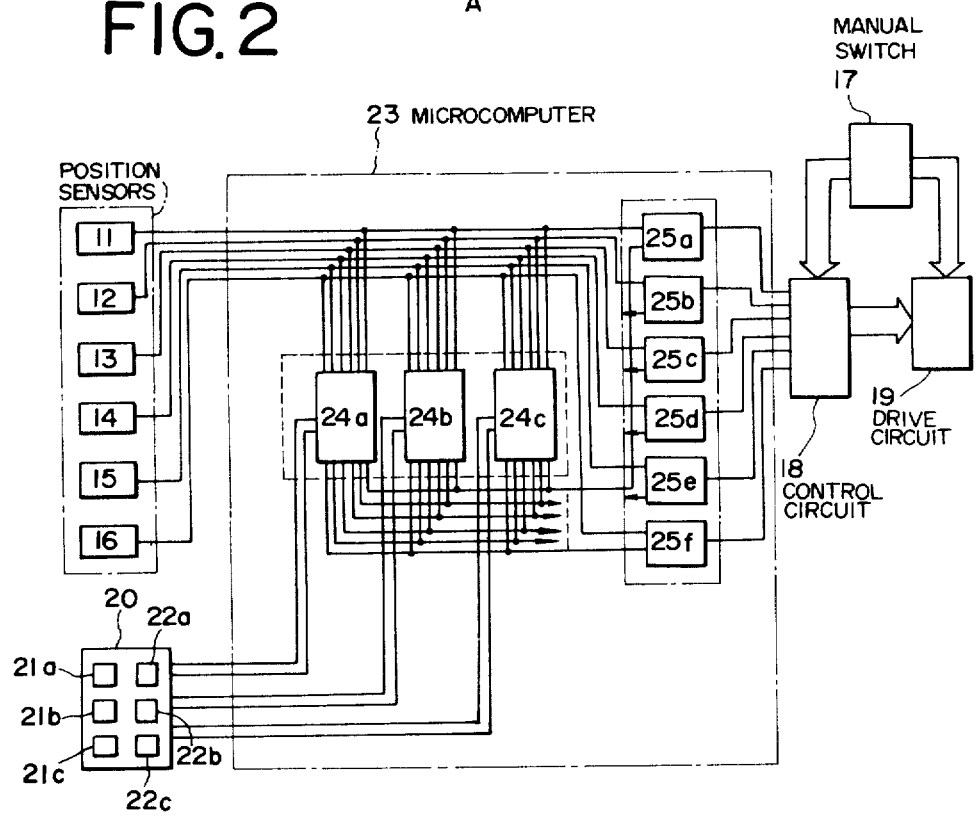
FIG. 2 is a block diagram showing a conventional seat position automatic adjusting device.

As shown in FIG. 2, the seat position adjustment device includes a plurality of position sensors 11, 12, 13, 14, 15 and 16 corresponding to the various adjustable seat positions.

However, within the internal portion of a motor-powered seat, the driving motor and other adjustment mechanism for each of the seat position adjustment are incorporated so that it is difficult to secure a space within which these position sensors are assembled. Furthermore, a major change of the internal mechanism of the powered seat would be involved if these position sensors were assembled into the narrow space.

Figure 3:
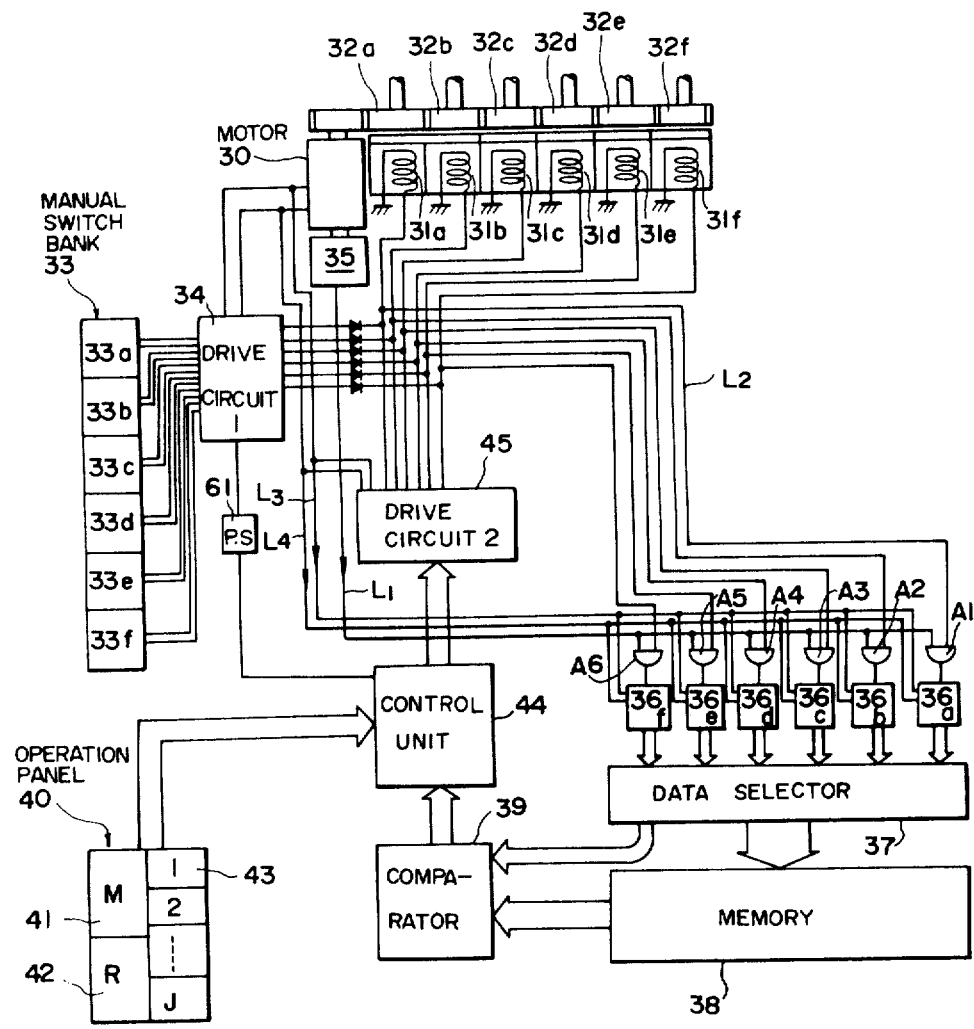
FIG. 3 shows one preferred embodiment of the present invention.

With reference to FIGS. 3 and 4, a preferred embodiment according to the present invention will be described.

FIG. 3 is a block diagram showing one preferred embodiment of the present invention. A reversible motor 30 acts as a driving source. A plurality of electromagnetic clutches 31a through 31f transmit a turning force of the motor 30 to a plurality of actuators 32a through 32f of the position adjusting mechanism. Manual switch bank 33 comprises a plurality of switches 33a through 33f, each of which corresponds to each seat member adjusting mechanism. A first drive circuit 34 is connected between the manual switch bank 33 and motor 30 for driving the motor 30 and one of electromagnetic clutches 31a through 31f.

A rotation number detector 35 for detecting the amount of rotations of the reversible motor 30 is used for outputting the number of pulses proportional to the rotation number after detecting the amount of rotations of the motor 31.

In addition to the above-described configuration, other circuits are described for manually adjusting the seat position in accordance with the operation of a manual switch in the manual switch bank 33. A plurality of reversible counters 36a through 36f are provided for counting the detected pulse numbers from the rotation number detector 35. A plurality of AND gates $A_1$ through $A_2$ are connected to the output portion of the rotation number detector 35 for electrically connecting the rotation number detector 35 to each corresponding counter of 36a through 36f if a drive signal from the first drive circuit 34 is entered. Numeral 38 denotes a memory for storing position data via a data selector 37 from the reversible counters 36a through 36f. A comparator 39 is provided for outputting a signal according to the difference between position data from the memory 38 and counted changed positon data from the reversible counters 36a through 36f via the data selector 37. An operation panel 40 is provided with a memory switch 41, return switch 42, and address switches 43 specifying a memory location of the memory 38.

A control unit 44 outputs a control signal depending on the output contents from the comparator 39, an address signal, and write or read signal to the memory 38 according to an operation signal from the operation panel 40. A second drive circuit 45 connected to the control unit 44 outputs a driving signal according to the signal from the control unit 44 into the motor 30 and one of the clutches 31a through 31f. A priority selector 61 sets a priority order at a time when the manual switch bank 33 and one of the switches on the operation panel 40 are operated simultaneously.

There are also provided a plurality of addresses of switches 43 each of which indicates an allocation number j (j = 1, 2, . . . , n) for identifying a driver to take the seat. Depending on the specification of one of the allocation numbers, the address information of the memory 38 is determined from the matrix shown in Table 1.

TABLE 1

| j\i | 1 | 2 | 3 | 4 | 5 | ... | ... | ... | ... | m |
|---|---|---|---|---|---|---|---|---|---|---|
| 1 | | | | | | | | | | |
| 2 | | | | | | | | | | |
| : | | | | | | | | | | |
| : | | | | | | | | | | |
| : | | | | | | Aij | | | | |
| : | | | | | | | | | | |
| : | | | | | | | | | | |
| n | | | | | | | | | | | i indicates a seat position adjustment number
j indicates a driver allocation number In the following seat position adjustment by manual operation is described. When, e.g, the switch 33a of the manual switch bank 33 is operated, a drive signal is applied from the first drive circuit 34 to the reversible motor 30 to actuate the motor 30 to rotate in the normal or reverse direction depending on either of which positions the manual switch 33a is depressed, e.g., rear direction side or front direction side. The drive signal is simultaneously fed into the electromagnetic clutch 31a via a diode. The output rotating shaft of the motor 30 is thereby engaged with the actuator 32a to transmit the motor turning force thereto. A seat member positioning mechanism engaged with the actuator 32a in this case makes a seat front-and-rear adjustment. For other switches 33b, 33c, 33d, 33e and 33f of the same mechanism as 33a, when the switches are operated in this order, the operation of the motor 30 and corresponding electromagnetic clutch among 31b through 31f enables corresponding seat member position adjustment sequencially.

On the other hand, when the switch 33a of the manual switch bank 33 is operated, the rotation number detector 35 detects the number of rotations of the reversible motor 30 and outputs a pulse, the number of which corresponds to the amount of rotations of the reversible motor 30. The signal for driving an electromagnetic clutch 31a is branched by a line $L_2$ to enable the AND gate $A_1$.

Therefore, the output pulse of the rotation number detector 35 passed through a line $L_1$ is counted by the reversible counter 36a and the driving signal of the reversible motor 30 is applied via lines $L_3$ and $L_4$ so that the counter 36a also performs addition or subtraction (increment or decrement) depending on the polarity across the lines $L_3$ and $L_4$, i.e., the direction in which the reversible motor rotates.

For each of the other switches 33b through 33f, according to the rotation number of the reversible motor 30 the adjustment position each seat member is counted by the corresponding counter of 36b through 36f.

Thus, upon completion of manual operation to adjust the seat position, the position data of each counter 36a through 36f are written into the memory 38. In other words, when the memory switch 41 on the operation panel 40 and the address switch whose number are allocated to a driver which has been seated, e.g., j = 1 are operated, the control unit 44 outputs a write signal to the memory 38 to store the position data.

The operation sequence to write a seat position data into the memory 38 is described hereinafter, when a microcomputer is used as the control unit 44.

As shown in the program flowchart of FIG. 4, at the stage of a decision block 46, the microcomputer checks to see that the memory switch is turned on. When the memory switch 41 is turned on, the microcomputer advances to a decision block 47, ensuring that the driver allocation number j is 1.

Since j=1 is on, at a processing block 48, the microcomputer specifies address numbers based on the j line, shown in Table 1.

At a decision block 47, the routine repeats to increment one by one until one of the allocation numbers j is found to be turned on. After each address of j line is specified, ensuring that i=1, the microcomputer issues an i line load instruction on a basis of Table 1 at a processing block 49.

Consequently, counted position data of the reversible counter 36a are written into a specified address, e.g., $A_{11}$. Next the contents of the counter 36b are written into a specified address, e.g., $A_{21}$.

Thereafter, the routine advances a decision block 50 with plus one added to i (i+1) where the microcomputer checks to see if i=N+1 (N indicates the number of seat adjustment positions, i.e., N=6). Finally, the write operation of the sixth reversible counter 36f is completed, i.e., i=7, and the routine returns to the initial state to be ready for the next write processing.

Seat position data stored in the memory 38 is used for adjusting the motor-powered seat position to return it to a position corresponding to the data stored in the memory 38.

The return switch 42 on the operation panel 40 and the number of the address switch which the driver specifies, e.g., j=1 may be operated when the driver requires the seat to return an original position.

Upon the operation of both switches, the control unit (microcomputer) 44 sends a read signal and outputs the address number data to the memory 38. At this time, the control unit 44 reads out the seat position data from the addresses sequencially and feeds them into the comparator 39 where the read out data are compared sequencially with position data which the counters 36a through 36f have counted.

These difference representative signals are in turn outputted to the control unit 44 from the comparator 39 when the difference exists between these compared data.

The control unit 44 sends a control signal according to the difference obtained from the comparator 39 to the second drive circuit 45.

The second drive circuit 45 drives the motor 30 and at the same time drives electromagnetic clutch 31a so that the actuator 32a moves the seat member positioning mechanism toward an originally adjusted position if, e.g., the counted position data obtained by the counter 36a are different from the originally adjusted position data. If the comparator 39 finds both data to accord with each other, the control unit 44 then operates so that the succeeding actuator 32b moves the seat member positioning mechanism toward its originally adjusted position.

With reference to the flowchart of FIG. 4, the operation of the control unit (microcomputer) 44 to return a current seat position to the originally adjusted position is described hereinafter.

First, at a decision block 51, the microcomputer checks to see whether the return switch 42 is turned on, and at a decision block 52, the microcomputer checks to see which if any of the address switches 43 (e.g., j=1) is operated. At a processing block 53, the microcomputer issues an address output instruction of j=1 line shown in Table 1. Thereafter, ensuring that i=1, at a processing block 54 the microcomputer issues an address output instruction on i=1 line.

Consequently, the microcomputer reads out originally adjusted position data in an address $A_{11}$ of the memory 38. At three processing blocks 55, 56 and 57, the magnitude difference between the originally adjusted position data $A_{11}$ and a current position data $D_{11}$ is obtained. At the decision block 55, if $A_{11} = D_{11}$, the microcomputer advances toward a decision block 58 with i incremented by one (i+1) where the microcomputer decides whether i=N+1.

Since the least number of i equals 2 in this case (2 is lower than N (N=6), the data comparison in the case i=2 is started.

If $A_{11} > D_{11}$, the microcomputer advances from a decision block 56 to a processing block 59.

At the processing block 59, the microcomputer issues an output instruction to turn on the electromagnetic clutch 36a in the case of i=1 and drive the motor 30 toward normal direction until $A_{11} = D_{11}$.

After the comparator 39 indicates that $A_{11} = D_{11}$, the microcomputer stops issuing the i address output instruction.

In addition, if $A_{11} < D_{11}$, the microcomputer advances from the decision block 57 to a processing block 60. At the processing block 60, the microcomputer issues an output instruction to turn on the electromagnetic clutch 36a and move the motor toward a reverse direction until the current position adjusted data $D_{11}$ equals the original position adjusted data (i.e., $A_{11} = D_{11}$). Furthermore, for the case of i=2, 3, ..., m, similar processing is executed sequencially.

As described hereinbefore, according to the present invention, seat position controlled by means of a plurality of seat member position adjusting mechanisms is driven by a single reversible motor. The seat adjusted position can be determined from the number of rotations of the reversible motor so that there is no need for providing a position sensor for each of the adjustment mechanisms and the addition of a control function that permits an automatic position setting can be achieved easily by microcomputer circuitry.

It will be understood by those skilled in the art that the above and other similar modifications may be made in the preferred embodiment described above without departing from the spirit and scope of the present invention, which is to be defined by the appended claims.

What is claimed is:

1. A seat position automatic adjusting device which operatively and selectively adjusts each of a plurality of seat members to a desired position and returns the currently adjusted set position of each of the seat members to a preset position defined by originally adjusted seat position data, the seat members including a seat, a a seat cushion fixed on the seat, a seat back, and a head restraint attached on the seat back, which comprises:

a reversible motor;
a seat member adjusting mechanism incorporated into each seat member and operatively engaged with said reversible motor so as to move the corresponding seat member to a required position determined by a number of revolutions and rotating direction of said reversible motor;

a motor drive circuit for driving said reversible motor to rotate selectively in the normal or reverse direction by a required number of revolutions with said seat member adjusting mechanism engaged with said reversible motor; and a control circuit connected to said reversible motor and motor drive circuit for detecting and storing the number of revolutions and rotating direction of said reversible motor when said motor drive circuit engages said reversible motor with said seat member to set the corresponding seat member and for operatively outputting a signal to said motor drive circuit to drive said reversible motor to rotate selectively in the normal or reverse direction according to the number of revolutions and rotating directions of said reversible motor stored therewithin so that the corresponding seat member returns to the original position;

wherein said seat member adjusting mechanism includes means for selectively adjusting each seat member position so as to move the seat position up-and-down or back-and-forth, to recline the seat back forward or backward with respect to a vertical position, to incline the seat cushion and seat support portion with respect to a horizontal position to tilt a lumbar support position of the seat back forward or rearward, or to extend the head restraint in up-or-down direction with respect to the seat back, and said seat member adjusting mechanism comprises:

an actuator for applying a turning force to the corresponding seat member so as to move the corresponding member to a required position; and an electromagnetic clutch provided with said corresponding actuator for engaging an output rotating shaft of said reversible motor with said corresponding actuator when said motor drive circuit drives said reversible motor;

and wherein said control circuit comprises:

rotation number detector means coupled to an output rotating shaft of said reversible motor for outputting a pulse train according to the rotation of said reversible motor, the number of which corresponds to the amount of revolution of said reversible motor;

a seat position data counter connected to said rotation number detector for counting the number of pulses fed from said rotation number detector decrementally or incrementally according to the rotating direction of said reversible motor;

an operation panel having a first switch for outputting a first command signal to store the counted value of said seat position data counter when manually turned on, a second switch for outputting a second command signal to send the counter value of said seat position data counter into said motor drive circuit so as to return each seat member to the preset position when manually turned on, and a plurality of address switches, each address thereof specified respectively for an individual user of the seat for activating the first and second command signals only when manually turned on;

a memory for storing the counted value of said seat position data counter in response to the first command signal from said first switch activated by any one of the address switches of said operation panel and outputting the counter value of said seat position data counter stored therewithin in response to the second command signal from said second switch activated by any one of the address switches of said operation panel;

a comparator for comparing the originally adjusted seat position data stored in said memory with the currently counted value of said seat position data counter; and a control unit responsive to said comparator for outputting a signal to said motor drive circuit to drive said reversible motor to rotate in the normal or reverse direction according to the number of revolutions and rotating directions of said reversible motor based on the compared result within said comparator in response to the first command signal activated by any one of the address switches received from said operation panel.

2. A seat position automatic adjusting device as set forth in claim 1, wherein said motor drive circuit further comprises:

a plurality of manual switches each corresponding to an adjustable direction of one of the seat members;

a first drive circuit connected to said manual switches for driving said reversible motor in the normal or reverse direction and for engaging one of said electromagnetic clutches with said reversible motor, the rotating direction of said reversible motor and the engagement of said reversible motor with one of said electromagnetic clutches depending upon the position of said corresponding manual switch operation; and a second drive circuit connected to said control unit of said control circuit for driving said reversible motor in the normal or reverse direction and for engaging one of said electromagnetic clutches with said reversible motor, the rotating direction of said reversible motor and engagement of said reversible motor with one of said electromagnetic clutches depending on the signal received from said control unit of said control circuit.

3. A seat position automatic adjusting device as set forth in claim 1, wherein said control circuit further comprises:

a priority selector connected between said first drive circuit and control unit for determining a priority between the operation of said first drive circuit and that of said control unit at a time when said one of manual switches and one of the switches on the operation panel are operated simultaneously.

4. A seat position automatic adjusting device as set forth in claim 2, wherein said seat position data counter comprises:

a plurality of AND gates each connected to said rotation number detector and to said first and second drive circuits for enabling the signal from said rotation number detector to pass therethrough while an input signal from either of said first and second drive circuits is received;

a plurality of reversible counters each connected to a corresponding said AND gate for incrementing or decrementing the amount of rotations of said reversible motor according to the polaruty of the driving signal to said reversible motor from either of said first and second drive circuits; and a data selector connected to said reversible counters for selectively collecting seat position data from each of said reversible counters.

5. A seat position automatic adjusting device which operatively and selectively adjusts each seat member of a seat to a desired position and returns each said seat member to a preset position defined by originally adjusted seat position data comprising:
- manual seat position adjusting means, including a plurality of manual switches corresponding respectively to the selected direction of movement of the seat members for selectively and independently moving the seat members to their respective desired positions in response to an operation of their corresponding manual switches by an operator, said position adjusting means generating a number of pulses corresponding to a distance by which the corresponding seat member is moved along the selected direction;
- seat position memory means, including a memory switch and a plurality of address switches, for counting the number of pulses received from said manual seat position adjusting means and storing the counted number of pulses received from said manual seat position adjusting means incrementally or decrementally depending selectively on the direction toward which the corresponding seat member is moved and storing the counted number of pulses in an address specified by the selected direction of the corresponding seat member, and one of said address switches, said address switch being allocated to a particular operator, in response to operations of said memory switch and address switch; and
- automatic seat position returning means for operatively returning the current position of each seat member to a respective preset position, including a return switch, means for comparing data associated with each seat member adjusted position stored in the corresponding address of said seat position memory means representing the preset position of the corresponding seat member selected direction with that counted by said seat position memory means representing the preset position previously adjusted by the operator, and means for driving the corresponding seat member to return the current seat position to the preset position according to the result of the comparison by said comparing means, said automatic returning means being operative in response to operations of said return switch and one of said address switches allocated to the operator.

6. A seat position automatic adjusting device as set forth in claim 5, which further comprises:
- a priority selector for determining a priority among the operation of said manual seat position adjusting means, that of said automatic seat position returning means, and that of said seat position memory means at a time when said one of manual switches and return switch, memory switch, or one of address switches are operated simultaneously.

* * * * *